Oct. 12, 1926.
H. F. GORSUCH
GRAVITY DUMP
Filed Dec. 14, 1923    3 Sheets-Sheet 2
1,602,484
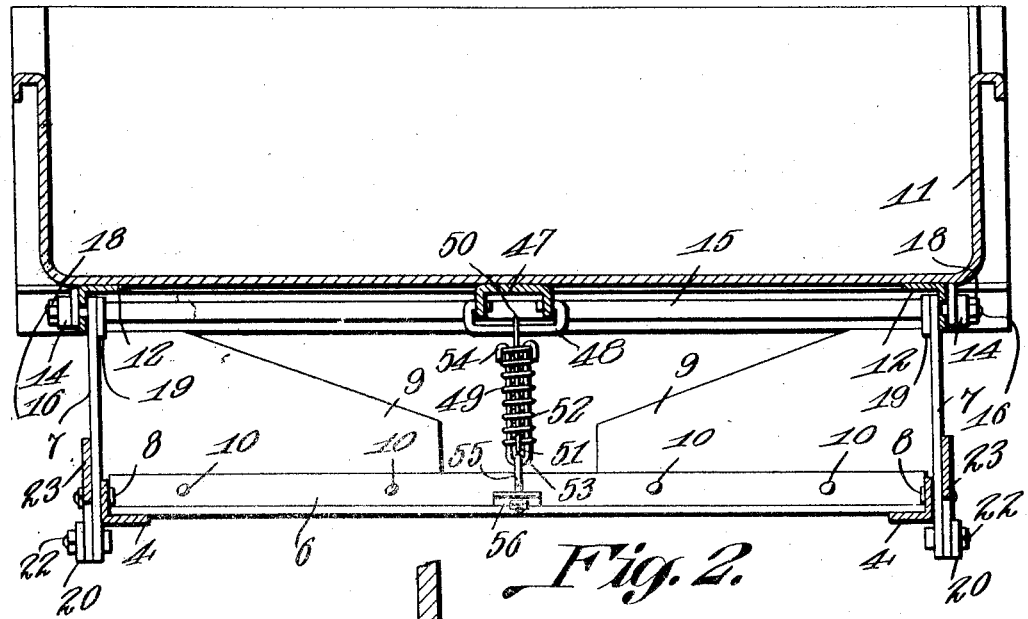
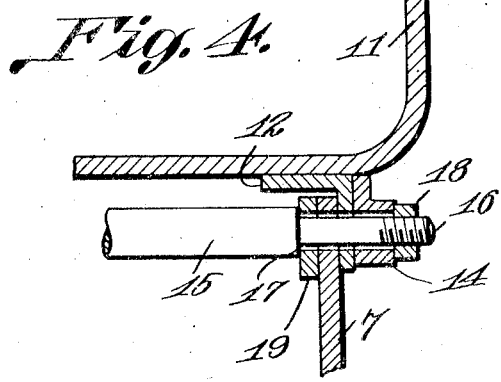
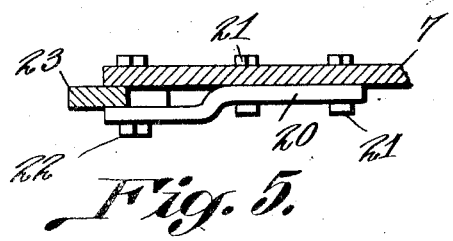
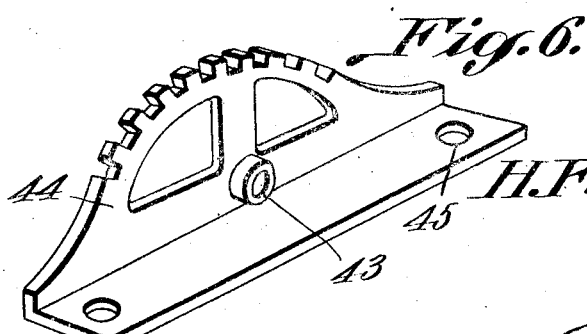
H. F. Gorsuch, Inventor
By C. A. Snow & Co. Attorneys

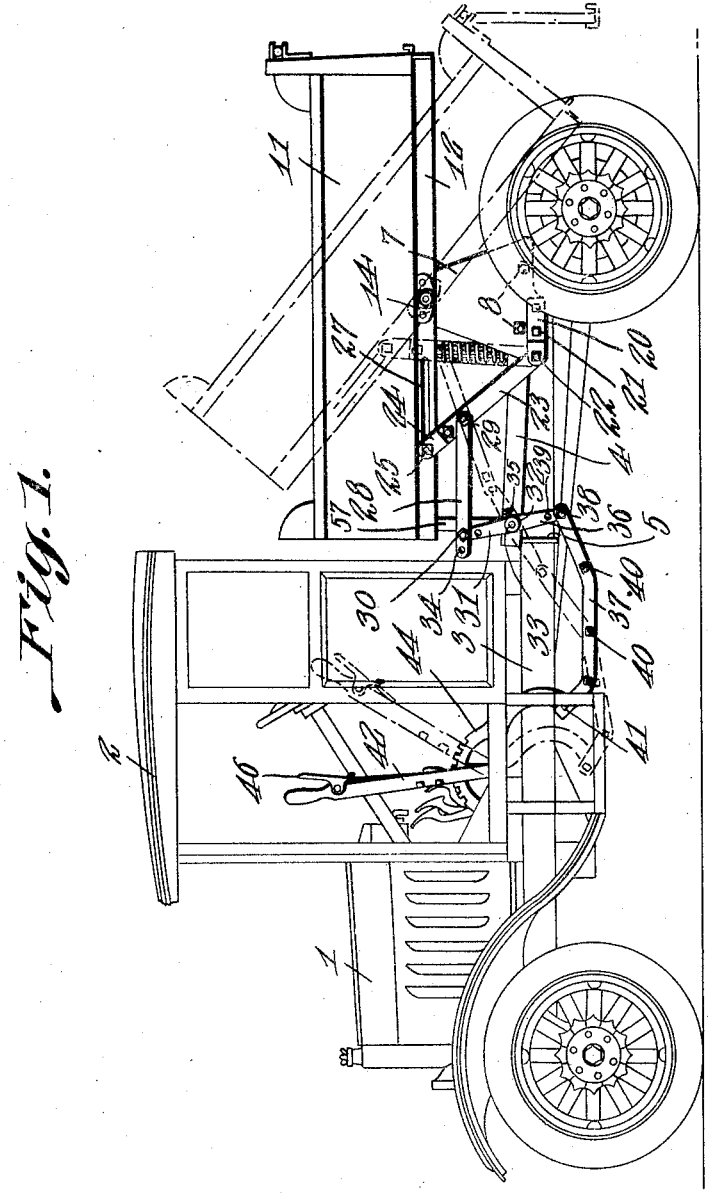

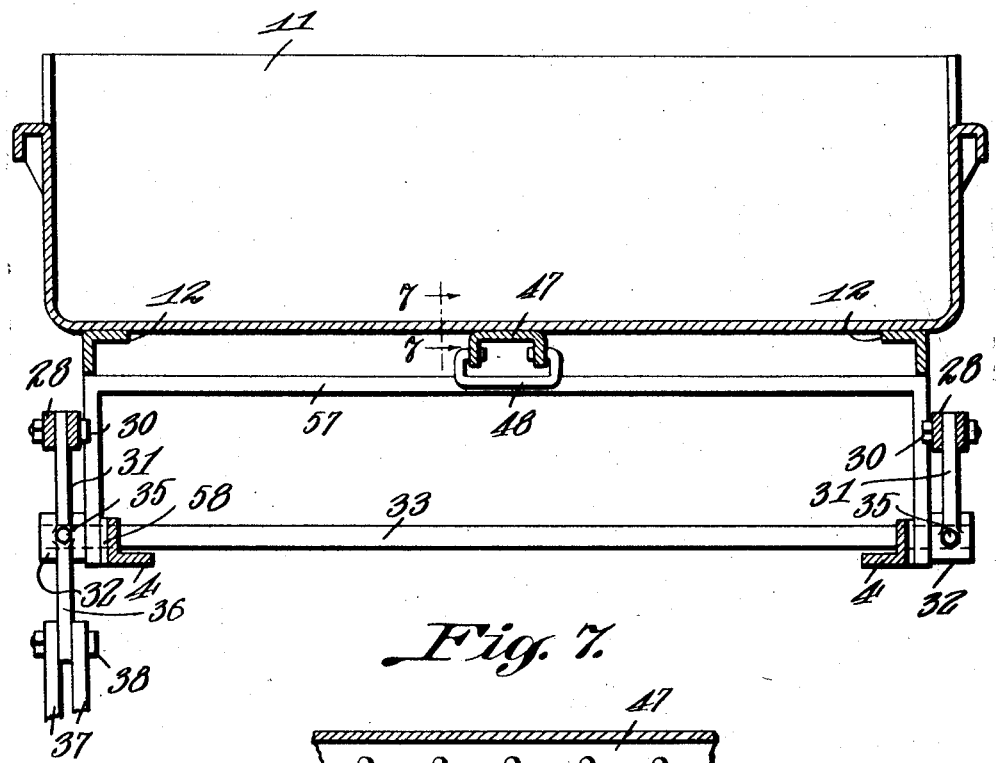
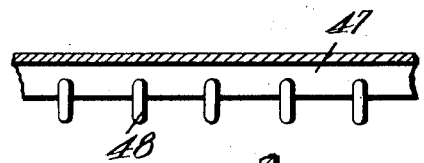
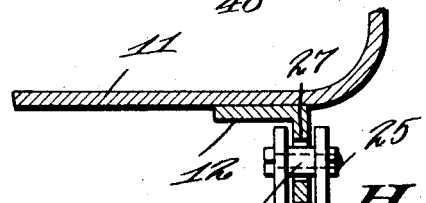

Patented Oct. 12, 1926.

1,602,484

UNITED STATES PATENT OFFICE.

HOWARD F. GORSUCH, OF GALION, OHIO.

GRAVITY DUMP.

Application filed December 14, 1923. Serial No. 680,700.

This invention aims to provide novel means whereby a dumping body may be mounted readily on a truck, for vertical swinging movement, novel means being afforded for operating the body from within the cab of the truck.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made, wthout departing from the spirit of the invention.

In the accompanying drawings:

Figure 1 shows in side elevation, a device constructed in accordance with the invention; Figure 2 is a cross section looking toward the rear end of the body; Figure 3 is a cross section looking toward the forward end of the body; Figure 4 is an enlarged sectional detail illustrating the mounting of the body; Figure 5 is a fragmental section disclosing one of the brackets and attendant parts; Figure 6 is a perspective showing the segment; Figure 7 is a longitudinal section taken through the bracket which is mounted on the dumping body; Figure 8 is a transverse section showing the connection between the body and the radius arm, parts appearing in elevation.

The numeral 1 marks a motor-propelled truck including a cab 2, the frame of the truck comprising chassis bars 3.

In putting the present invention into practice, there is provided a carrying frame including side rails 4 superposed on the chassis bars 3 and secured thereto, as indicated at 5. The side rails 4 of the carrying frame are united at their rear ends by a cross piece 6. Supports 7, in the form of plates, are secured at 8 to the outer surfaces of the side rails 4. Intermediate thereof their forward and rearward edges, the supports 7 are supplied with inwardly extended reinforcing wings 9 which are secured at 10 to the cross piece 6.

The numeral 11 marks a dumping body, longitudinal rails 12 being secured to the bottom of the body. Bearings 14 are secured to the outer surfaces of the rails 12. The numeral 15 marks cross rod having reduced ends 16 defining shoulders 17.

As shown in Figure 4, the reduced ends 16 of the cross rod 15 pass through the supports 7, through the rails 12 and through the bearings 14, nuts 18 being threaded on the outer extremities of the parts 16, and spacers 19 being interposed between the shoulders 17 and the supports 7, the body 11 thus being fulcrumed, intermediate its ends, on the supports 7 for vertical swinging movement.

The lower forward portions of the support 7 extend below the side rails 4 as shown in dotted line, in Figure 1, and to the said portions of the supports, approximately horizontal brackets 20 are secured as shown at 21. The brackets 20 are offset from the support 7 at the forward ends of the brackets, and in the forward ends of the brackets 20 and in the forward portions of the support 7, pivot elements 22 are mounted. The lower ends of radius arms 23 are disposed between the supports 7 and the forward ends of the brackets 20 and are mounted to swing on the pivot elements 22. At their upper ends, the radius arms 23 are provided with forks 24 (Figure 8) straddling the depending flanges of the longitudinal rails 12 which are mounted on the bottom of the body 11. Shafts 25, such as bolts, are mounted in the forks 24 and carry rollers 26 adapted to move in elongated slots 27 fashioned in the rails 12 of the body 11.

Links 28 are shown, the links being of double construction, as indicated clearly in Figure 3. The rear ends of the links 28 are pivoted at 29 to the radius arms 23, intermediate the ends of the radius arms. Pivot elements 30 connect the forward ends of the links 28 with upstanding arms 31, projecting from the hubs 32 mounted on a shaft 33, the links 28 and the arms 31 having a plurality of openings 34, adapted to receive the pivot elements 30, for adjustment. Set screw 35 or the like, mounted in the hubs 32, hold the arms 31 on the shaft 33, the shaft 33 being mounted to rock in the side rails 4 of the carrying frame. One of the hubs 32 has a depending arm 36 whereunto a double link 37 is pivoted at 38, the arm 36 having one or more additional openings 39 adapted to receive the pivot element 38 for adjustment. The constituent members of the double link 37 are united by securing elements 40.

The forward end of the link 37 is pivoted at 41 to a lever 42, the lever being fulcrumed intermediate its ends at 43 on a segment 44 secured at 45 to the floor of the cab 2 or elsewhere, the lever carrying a latch mechanism 46 adapted to cooperate with the segment 47, to hold the lever in adjusted positions, the lever and the latch mechanism being readily accessible to a person occupying the driver's seat in the cab 2.

A bracket 47 of inverted U-shape is secured to the bottom of the body 11 and extends longitudinally of the vehicle. A plurality of connecting elements 48, such as bails, are mounted on the bracket 47 and are spaced apart longitudinally of the vehicle. The numeral 49 marks a tension member, provided at its upper end with a hook 50 or the like, adapted to be engaged for adjustment with any of the connecting elements 48. At its lower end, the tension member 49 is supplied with a hook 51, adapted to engage the lower end of a compression spring 52, through which the tension member 49 passes. A U-shaped tension member 53 is located within the spring 52 and is provided at its upper end with hooks 54, engaging the upper end of the spring, the bend of the tension member 53 being united by a connection 55 with a foot plate 56 projecting forwardly from the cross piece 6 of the carrying frame.

The numeral 57 marks an inverted U-shaped prop which is connected at 58 with side rails 4, the shaft 33 passing rotatably through the lower ends of the prop 57. When the body 11 is in a horizontal position, as shown in Figure 1, the forward end of the body rests on the prop 57.

A person occupying the driver's seat in the cab 2 may swing the lever 42. When the lever 42 is swung in one direction, motion is transmitted to the link 37, and, through the medium of the depending arm 36, rocking movement is imparted to the shaft 33, the arms 31 swinging with the shaft, and the links 28 swinging the radius arms 23, the rollers 26 moving in the slots 27 of the rails 12 on the body 11, the body being over-balanced, so that the body will tilt into the depending position shown in dotted line in Figure 1, the ends 16 of the cross rods 15 (Figure 4) serving as a fulcrum for the body. When the body is tilted as aforesaid, the load will slide readily out of the body. When the body is tilted into the dotted line position of Figure 1, the spring 52 (Figure 2) is put under compression, owing to the relative movement between the tension members 49 and 53, the tension member 49 being connected to the body 11, and the tension member 53 being connected to the carrying frame. The spring 52 acts as a cushioning member, when the body 11 is tilted to the dotted line position of Figure 1, and because the spring is put under compression, it acts as an assisting means for returning the body 11 into horizontal position in engagement with the prop 57 as shown in solid line in Figure 1, it being possible to return the body 11 from the dotted line position to the solid line position of Figure 1 by swinging the lever 42 in a direction opposite to that hereinbefore alluded to.

I claim:

The combination with a truck including chassis bars, of side rails superposed on the chassis bars, means for securing the side rails to the chassis bars, a cross piece connecting the side rails near to their rear ends, plates secured to the side rails and provided intermediate their forward and rear edges with inwardly extended reinforcing wings which are secured to the cross piece, a dumping body including a bottom, longitudinal rails secured to the bottom of the body and having slots, a cross rod extended through the plates and engaging the longitudinal rails to form a fulcrum for the dumping body, brackets mounted on the lower portions of the plates, radius arms mounted to swing on the brackets, the radius arms being provided with members which are slidably engaged in the slots of the longitudinal rails, and means for operating the radius arms to effect a dumping movement in the body.

In testimony that I claim the foregoing as my own, I have hereto affixed my signature.

HOWARD F. GORSUCH.